Patented July 26, 1932

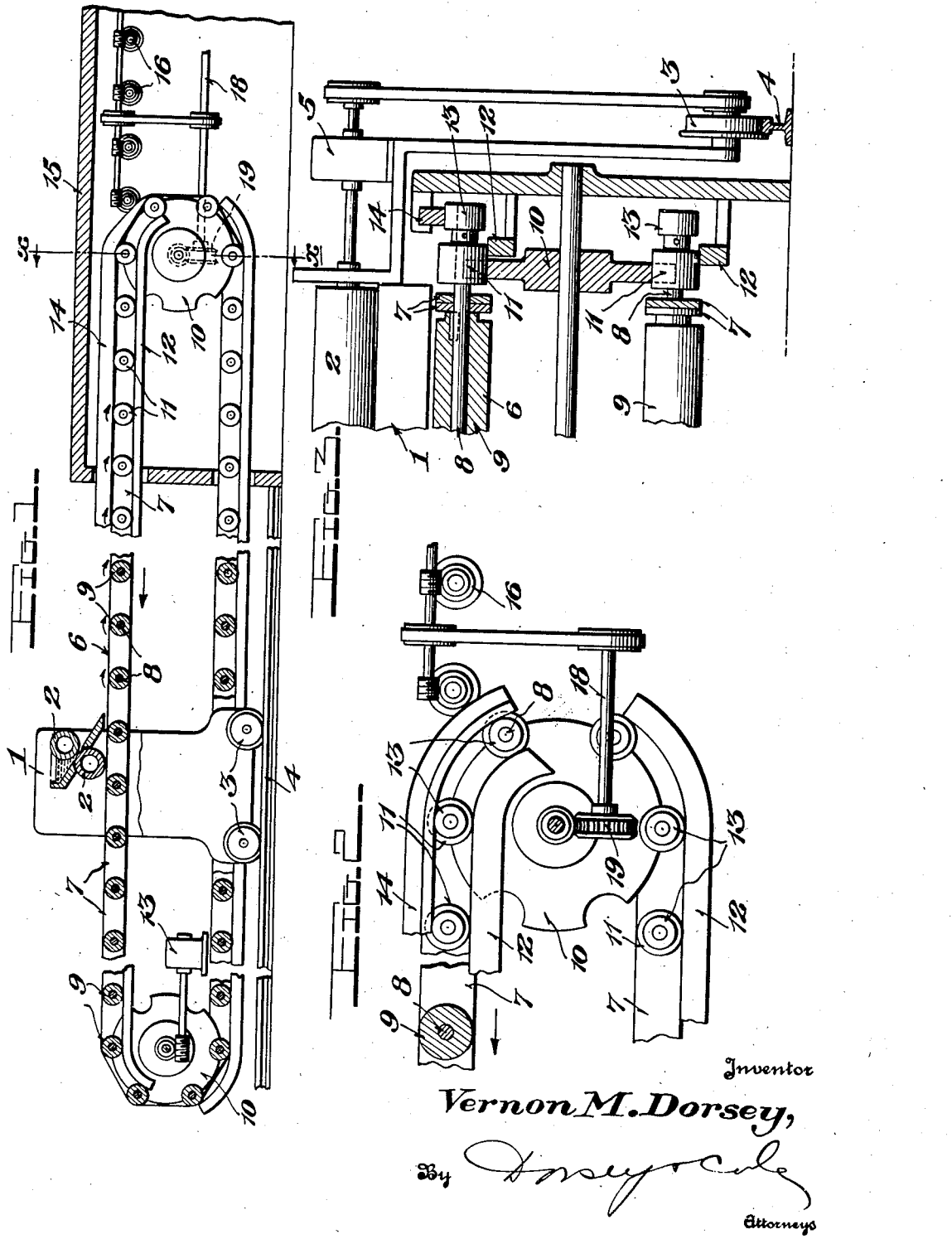

1,869,306

UNITED STATES PATENT OFFICE

VERNON M. DORSEY, OF CHEVY CHASE, MARYLAND, ASSIGNOR, BY MESNE ASSIGNMENTS, TO THE AMERICAN BICHEROUX COMPANY, OF WILMINGTON, DELAWARE

RECEIVING GLASS SHEETS

Application filed June 13, 1930. Serial No. 461,024.

The object of this invention is to provide for the reception of glass sheets from an intermittent forming machine in which they are formed at a relatively high rate of speed, and the delivery thereof to a conveyor, and ultimately through a lehr having a relatively low lehring speed, in such a manner that the sheet may be received from the forming machine and carried through the lehr at lehring speed, all without reducing the speed of forward movement of the sheet below that which it had at the time of formation.

For this purpose it comprises an endless belt apron whose glass-receiving run moves rearwardly in respect to the feed of the sheet, and comprises a series of rollers tending to advance the sheet, and a forming machine delivering glass to the apron while moving rearwardly, the speed of motion of the several parts being such as to produce an absolute forward movement of the sheet at the proper lehring speed, and it further comprises the combination, construction and arrangement of the several parts of which it is composed, as will be hereinafter described and claimed.

Referring to the accompanying drawing in which corresponding parts are designated by corresponding marks of reference,—

Figure 1 represents a device embodying my invention.

Figure 2 is a detail in elevation of the part of the structure shown in Figure 1.

Figure 3 is a fragmental vertical transverse vertical section taken at the line X—X of Figure 1.

1 represents a suitable sheet-forming machine, preferably of the Bicheroux type, having forming rollers 2, 2, with a pass between them at which the sheet is formed, and from which it is delivered to the upper run of an endless apron. The forming machine has wheels 3, moving on the tracks 4. The rollers 2, 2, and the wheels 3 may be driven by a suitable motor 5 geared thereto in such a manner that the desired speed of movement of the forming machine and of the rollers 2, 2, may be assured.

The glass-receiving apron 6 may be of any approved chain construction. As shown it is made up of the two series of links 7, the several links of each series being pivoted together at their ends by the shafts 8, which have keyed thereon between the opposite series of links, the glass-carrying rollers 9. The belt is carried over sprocket wheels 10 at opposite ends of the runs, so that it has an upper and lower run. Intermediate of the sprockets, the belt is carried by wheels 11, loose on the shafts 8, and moving on tracks 12. The belt may be moved on these tracks by a suitable motor 13ª geared to a sprocket, the arrangement being such that the upper run of the belt is driven rearwardly in respect to the movement of the sheet in formation.

The rollers 9 when in the upper run, are rotated in such a direction that they tend to advance the sheet. This motion may be given to them by keying on their axes, wheels 13 running at such times along the lower surface of a track 14, the relative diameter of the wheels and of the rollers being such as to give the relation hereinafter stated between the peripheral speed of the rollers and the speed of the belt.

With the parts thus arranged, it is possible to form a sheet of glass at high speed, to receive it, with a forward movement at much lower speed, and to remove it to or through a lehr at a much lower speed. Thus if we presume that the proper lehring speed is five feet a minute, and that the desired speed of formation is sixty feet a minute and that the forming machine is moved rearwardly at a speed of fifty-five feet a minute, if the speed of the upper run of the belt is thirty-five feet a minute rearwardly, and the peripheral speed of the rollers is forty feet a minute, the sheet will, on issuing from the forming machine, be laid smoothly on the rollers, and while being so laid will be advanced in space at the rate of five feet a minute. This rate of advance will be maintained as long as the sheet is on the upper run of the belt, and accordingly the belt may be used as a means of conveying the sheet through a lehr 15. It will be noted that while the sheet is only advancing five feet a minute it is being shifted on the rollers at the rate of forty feet a minute, the rollers themselves being moved rearwardly at the rate of thirty-five feet a minute. This relatively high rate of movement of the sheet in respect to the rollers will be found advantageous in preventing sagging of the glass between the rollers of the glass while still hot.

If desired, instead of carrying the glass through the lehr on the belt conveyor, it may be delivered therefrom to a suitable conveyor comprising a series of non-travelling, but rotating rollers 16 whose peripheral speed is that desired for lehring, which in the above instance was five feet. To prevent the sagging of the sheet at the junction between the apron and the lehr conveyor, a bridge 17 may be placed in the gap. It is desirable to couple the drive for the apron and the lehr rollers in order to ensure proper relative speeds, and accordingly I have shown a method of doing this by driving the lehr conveyor rolls through the shaft 18, geared to the shaft of the sprocket wheel 10, as at 19.

It will be noted that in the construction proposed, all parts carrying the glass after the sheet is formed are in continuous motion at uniform speed, and that the sheets from the time they are formed, until removed from the apparatus, move forward continuously at uniform speed. This eliminates irregularities in the feed of the sheet, due to slipping on their supports, and breakage due to differences in velocity of the sheet itself, and of the supports by which it is carried. Furthermore, as soon after the formation of a sheet as the tail end thereof has been moved forward to the point when the head of that sheet was delivered to the belt, another sheet may be delivered from the forming machine which has been moved forwardly to the position it occupied when the commencement of the first sheet was started. Thus the sheets may be laid upon the belt close together, which position they will maintain in their subsequent movements.

Having thus described my invention what I claim is:

1. In an apparatus of the character described, the combination with a forming machine, of a belt conveyor having a series of glass-receiving rollers, and having an upper and lower run, one of which runs receives glass sheets from the forming machine, and means for moving the forming machine rearwardly during the formation of a sheet, for continuously driving the belt in such direction that its sheet-receiving run moves rearwardly and for rotating the rollers on such run so that their upper surfaces move forwardly.

2. In an appartus of the character described, the combination with a forming machine, of a belt conveyor having a series of glass-receiving rollers, and an upper and lower run, one of which receives glass sheets from the forming machine, means for moving the forming machine rearwardly during the formation of a sheet, means for continuously driving the belt in such direction that its sheet-receiving run moves rearwardly and means for rotating the rollers on such run so that their upper surfaces move forwardly.

3. In an apparatus of the character described, the combination with an endless continuously moving belt, a series of horizontal rollers mounted in the belt, a forming machine delivering a glass sheet as formed to the rollers on the upper run of the belt, means for moving the forming machine during the delivery of the sheet in the same direction as the belt, but at higher speed, and means for rotating the rollers on the upper run of the belt to feed the sheet on the belt in a direction opposite to the movement of such run of the belt and at a speed higher than the speed of such movement.

4. In an apparatus of the character described, the combination with a lehr conveyor, consisting of an endless belt, the upper run of which moves rearwardly at a constant speed, rollers on the belt, a rearwardly moving forming machine delivering glass sheets to the rollers on the upper run of the belt, and means for rotating the said rollers in such direction and such speed as to feed such sheets forwardly.

In testimony whereof I hereunto affix my signature.

VERNON M. DORSEY.